(12) United States Patent
Sun et al.

(10) Patent No.: US 6,497,760 B2
(45) Date of Patent: Dec. 24, 2002

(54) MODIFIED SOY PROTEIN ADHESIVES

(75) Inventors: Xiuzhi Sun, Manhattan, KS (US); Ke Bian, Henan (CN)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 09/896,751

(22) Filed: Jul. 2, 2001

(65) Prior Publication Data

US 2002/0005251 A1 Jan. 17, 2002

Related U.S. Application Data

(63) Continuation of application No. 09/337,294, filed on Jun. 21, 1999, now abandoned, which is a continuation-in-part of application No. 09/130,667, filed on Aug. 7, 1998, now abandoned.

(51) Int. Cl.[7] .................................................. C08L 3/00
(52) U.S. Cl. ................. 106/131.1; 156/336; 428/478.4; 530/408; 530/409
(58) Field of Search ....................... 156/336; 106/131.1, 106/FOR 132; 428/478.4; 430/408, 409

(56) References Cited

U.S. PATENT DOCUMENTS

| | | | | | |
|---|---|---|---|---|---|
| 2,297,341 | A | * | 9/1942 | Wood | 106/131.1 |
| 2,637,675 | A | * | 5/1953 | Bain | 156/336 |
| 2,816,099 | A | * | 12/1957 | Young et al. | 530/409 |
| 2,887,395 | A | * | 5/1959 | Rowe et al. | 106/131.1 |
| 3,021,321 | A | * | 2/1962 | Young et al. | 530/409 |
| 4,203,892 | A | * | 5/1980 | Friedman | 530/408 |

* cited by examiner

*Primary Examiner*—John J. Gallagher
(74) *Attorney, Agent, or Firm*—Hovey Williams LLP

(57) ABSTRACT

Modified soy protein adhesives are provided which have increased bonding abilities. The adhesives are prepared by forming a dispersion of soy protein, water, and a modifier selected from two classes of modifiers. The preferred modifiers are urea, sodium dodecylbenzene sulfonate, sodium dodecyl sulfate, and guanidine hydrochloride. The resulting dispersion is stirred, freeze-dried, and milled into a powder to be stored until use. The adhesives of the invention have superior bonding qualities while being safe for the environment. The urea-modified, GH-modified, SDS-modified, and SDBS-modified soy protein adhesives have higher water resistance than non-modified soy protein adhesives.

2 Claims, 2 Drawing Sheets

MODIFIED SOY PROTEIN ADHESIVES

RELATED APPLICATIONS

This is a continuation of application Ser. No. 09/337,294, filed Jun. 21, 1999, now abandoned which is a continuation-in-part of application Ser. No. 09/130,667, filed Aug. 7, 1998, now abandoned.

BACKGROUND OF THE INVENTION

1. Field of the Invention

The present invention is broadly concerned with modified soy protein adhesives, and methods of production and use thereof. More particularly, the invention relates to such adhesives produced by the reaction of soy protein with a modifier selected from two classes of compounds in an aqueous system wherein the adhesives exhibit higher water resistance than non-modified soy protein adhesives. In the use of the adhesives of the invention, the bonds between the adherends have high shear strengths. The adhesives are preferably formulated by mixing a quantity of soy protein with an aqueous dispersion comprising the modifier and reacting the mixture; the resultant adhesive may be used in a liquefied form or dried to a reconstitutable powder.

2. Description of the Prior Art

Large quantities of adhesives are used annually for such things as interior and exterior applications of plywood and particle board, paper manufacturing, book binding, textile sizing, abrasives, gummed tape, and matches. Petroleum-based and soy protein-based adhesives are two general types of adhesives used in such applications. Soy protein adhesives known in the art generally lack the gluing strength and water resistance compared to petroleum-based adhesives. Most of the petroleum-based adhesives, however, contain phenol formaldehyde which is harmful to the environment. Also, petroleum resources are naturally limited and politically controlled. Furthermore, petroleum-based adhesives are not biodegradable thus resulting in an unwanted accumulation of waste. As a result, soy protein polymers are being reconsidered as an alternative adhesive to reduce the usage of petroleum polymers and to prevent environmental pollution.

In soy protein-based adhesives, the protein molecules are dispersed, and thus partially unfolded, in dispersion. The unfolded molecules increase the contact area and adhesion of the protein molecules onto other surfaces and entangle each other during the curing process to provide bonding strength. However, while soy protein-based adhesives are environmental friendly and are derived from soybeans which are renewable and more abundant than petroleum resources, the currently available soy protein-based adhesives lack the increased gluing strength and water resistance which are advantageous in typical adhesive applications.

SUMMARY OF THE INVENTION

The present invention overcomes the problems noted above, and provides a soy protein-based adhesive having increased bonding abilities and high water resistance. The adhesives of the invention are formed by modifying soy protein (SP), preferably derived from soy protein isolate (SPI) with certain compounds (modifiers).

Two classes of mild chemical modifiers are preferred in the preparation of the adhesives of the invention. One preferred modifier class includes saturated and unsaturated alkali metal $C_8$–$C_{22}$ sulfate and sulfonate salts. Even more preferred are saturated and unsaturated alkali metal $C_{10}$–$C_{18}$ sulfate and sulfonate salts. Saturated alkali metal $C_8$–$C_{22}$ sulfate and sulfonate salts include all alkali metal alkyl (such as octyl and dodecyl) $C_8$–$C_{22}$ sulfate and sulfonate salts. Unsaturated alkali metal $C_8$–$C_{22}$ sulfate and sulfonate salts include all alkali metal alkenyl (such as decenyl and octadecenyl) $C_8$–$C_{22}$ sulfate and sulfonate salts and all alkali metal alkynyl (such as octynyl and tetradecynyl) $C_8$–$C_{22}$ sulfate and sulfonate salts. Two particularly preferred modifiers in this class are sodium dodecyl sulfate (SDS) and sodium dodecylbenzene sulfonate (SDBS).

Another preferred class of modifiers for forming the adhesives of the invention are those compounds having the formula I:

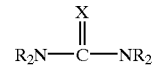

wherein each R is individually selected from the group consisting of H and $C_1$–$C_4$ saturated and unsaturated groups, and X is selected from the group consisting of O, NH, and S. The $C_1$–$C_4$ saturated and unsaturated groups refers to alkyl groups (both straight and branched chain) and unsaturated refers to alkenyl and alkynyl groups (both straight and branched chain). The preferred modifiers in this class are urea and guanidine complexed with hydrochloride.

Advantageously, the adhesives of the invention can be formed by utilizing mixtures of the foregoing modifiers. These mixtures can be within a class or they can contain modifiers from each class. For example, the modifier could be a mixture of urea and guanidine hydrochloride (which fall within the same class) or a mixture of urea and SDS.

When urea or guanidine hydrochloride (GH) is the modifier used to form the adhesives of the invention (hereinafter referred to as urea-modified soy protein adhesives or U-SPI and guanidine hydrochloride-modified soy protein adhesives or GH-SPI, respectively), the adhesives are preferably formed by preparing a mixture comprising (and preferably consisting essentially of) urea or guanidine hydrochloride (GH) and water with a quantity of soy protein thus forming a slurry or dispersion. Any source of soy protein (such as soybean concentrate or soybean meal) is suitable for making the adhesives of the invention, but a particularly preferred source of soy protein is soy protein isolate. The soy protein is preferably essentially free of urease, having less than about 10 activity units of urease. When urea is the modifier, the amount thereof should result in a urea content of at least about 6% by weight, preferably at least about 10% by weight, and more preferably at least about 15–18% by weight, based on the weight of the protein slurry. The amount of urea utilized is important in order to be certain that the protein molecules properly unravel in dispersion, thus increasing the contact area of the molecules as well as their adhesion onto other surfaces. These unraveled molecules will then entangle with each other during the curing process contributing to the increased bonding strength of the adhesives.

The resulting soy protein-urea or soy protein-GH aqueous dispersion is normally mixed for about 60 minutes. The forming of and mixing of the slurry is carried out at a temperature of from about 10 to about 80° C., and preferably from about 20 to about 50° C. Even more preferably, the forming and mixing of the dispersion takes place under ambient temperature and pressure conditions. The dispersion should have a pH of less than about 8, and more preferably less than about 7 (e.g., from about 2–7). After mixing, the reacted dispersion can be immediately used as an adhesive, or it can be freeze-dried, milled into a powder, and stored for later use. Or, if freeze-drying is not practical, the dispersion can be subjected to any known mechanism or process (such as spray drying) by which the moisture is substantially removed. This is just one example of how to form a modified soy protein adhesive utilizing a modifier (i.e., urea or GH) within this class of preferred modifiers. Any other modifiers having the formula I can be made in the same fashion, with appropriate process modifications depending upon the specific modifier chosen.

When sodium dodecyl sulfate or sodium dodecylbenzene sulfonate is the modifier used to form the adhesives of the invention (hereinafter referred to as SDS-SPI and SDBS-SPI adhesives, respectively), the process of forming the adhesives comprises mixing soy protein and water at room temperature for about 30 minutes to form a suspension or dispersion. Any source of soy protein (such as soybean concentrate or soybean meal) is suitable for making the adhesives, but a particularly preferred source of soy protein is soy protein isolate. SDS or SDBS is added to the suspension with the resulting dispersion being stirred for about 6 hours. Preferably, the SDS or SDBS is present in the resulting dispersion at a level from about 0.1 to about 15% by weight, and more preferably from about 0.5 to about 6% by weight based on the weight of said protein slurry. Preferably, the forming of the adhesive takes place under ambient temperature and pressure conditions. The final slurry should have the same pH ranges as the urea adhesives, and likewise such adhesives can be used in liquid or dried particulate form. This is just one example of how to form a modified soy protein adhesive utilizing a modifier (i.e., SDS or SDBS) which falls with the class of saturated and unsaturated alkali metal $C_8$–$C_{22}$ sulfate and sulfonate salts. Other adhesives made using modifiers within this class can be formed in a similar manner with appropriate process modifications depending upon the specific modifier chosen.

Regardless of the modifier utilized, the final dried adhesive powders should be small enough so that 90% of the powder particles pass through a 50 mesh screen, and preferably the powder particle size is such that 90% of the powder particles pass through a mesh screen having a size of at least about 100 mesh or higher ("higher" meaning e.g., 150 mesh or 200 mesh). The adhesive powders of the invention can be stored in powder form until the point-of-use. When the adhesive is needed, the powder is added to water (preferably distilled water) at a ratio of from about 1:20 to about 1:4, and preferably at a ratio of about 1:6 of SP powder:water. The powder is dispersed in the water at room temperature for about five minutes, preferably while heating to at least about 50° C. The resulting aqueous adhesive can then be applied to an adherend by any conventional application means, such as by brushing the adhesive onto a surface of the adherend, or by placing the adhesive between and in contact with a pair of adherends. Preferably the adhesive application is followed by compressing of the adherends in order to facilitate adhesion.

In some applications, it may be desirable to modify a soy flour having at least about 50% protein to form the adhesives of the invention. Suitable modifiers for include all of those set forth above, with the exception of urea (because soy flours contains appreciable quantities of urease). Guanidine hydrochloride, SDS, and SDBS are particularly preferred for modifying soy flours. The modified soy flours have improved water resistance and gluing strengths as compared to non-modified soy flours.

The adhesives of the invention are particularly useful for adhering cellulosic components, such as those formed of wood or paper. The amount of adhesive necessary can be varied as required by the characteristics of the adherends. When the adhesives of the invention are applied to wooden adherends, the gluing strength (i.e., the shear strength) of the adhesive is at least about 30 kg/cm$^2$, preferably at least about 50 kg/cm$^2$, and more preferably about 65 kg/cm$^2$.

DETAILED DESCRIPTION OF THE PREFERRED EMBODIMENTS

Figure 1:
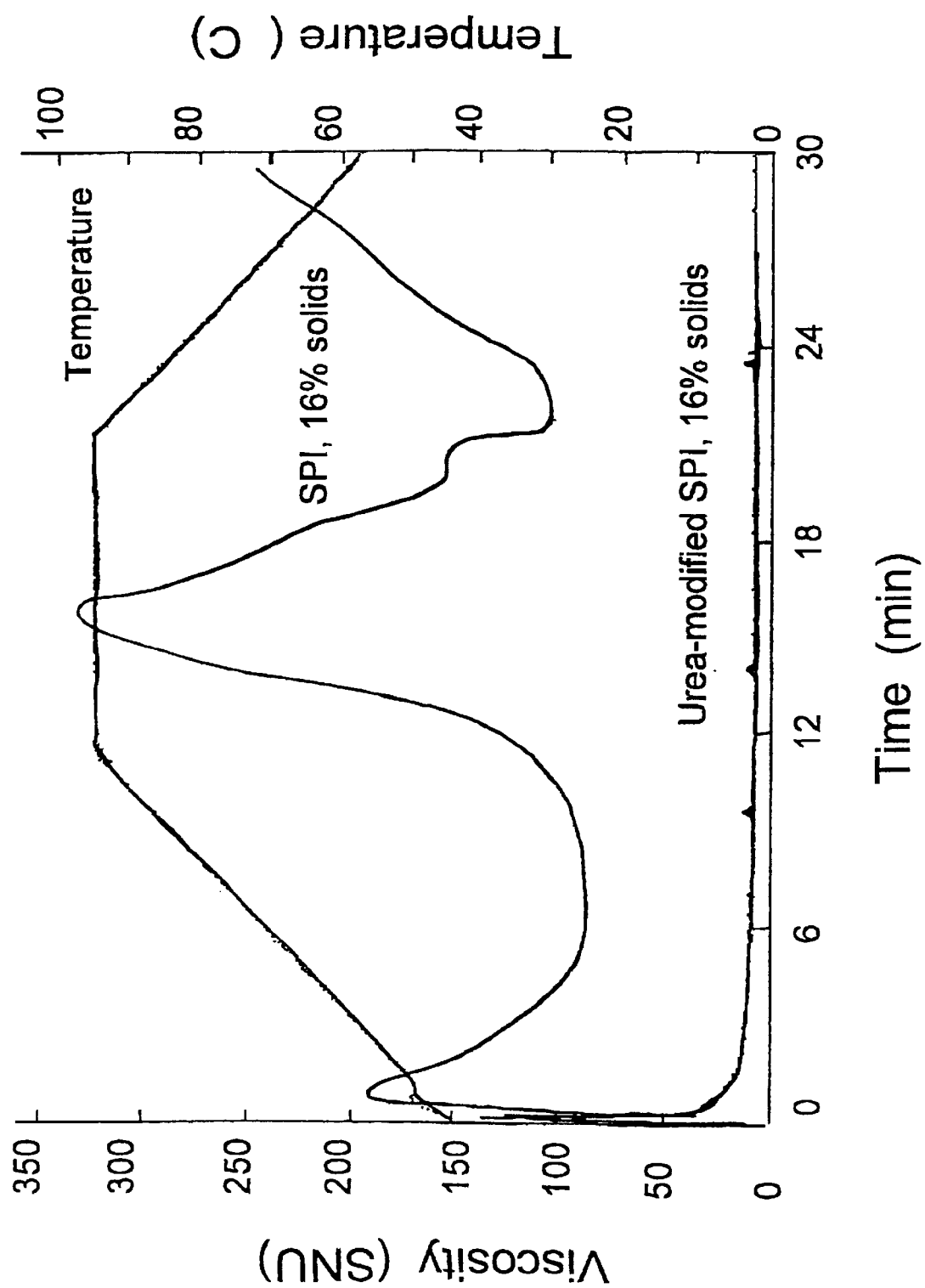
FIG. 1 compares the viscosity of U-SPI having a solids concentration of 16% to the viscosity of non-modified soy proteins having a solids concentration of 16%, as measured by a rapid viscosity analyzer.

The following examples set forth preferred aspects of the present invention. It is to be understood, however, that these examples are provided by way of illustration and nothing therein should be taken as a limitation upon the overall scope of the invention.

EXAMPLE 1

Preparation of the Samples

1. Urea-Modified Soy Protein Isolate (U-SPI)

Ten grams of SPI powder was added to 150 ml of 3.2 N urea-distilled water and stirred at room temperature for about one hour. The mixture was freeze-dried and milled into a powder.

2. Sodium Dodecyl Sulfate-Modified Soy Protein Isolate (SDS-SPI)

Fifty grams of SPI powder was added to 500 ml of distilled water and the solution was mixed at room temperature for about 30 minutes to form a uniform suspension. Twenty milliliters of a solution containing 25% SDS was added to the suspension followed by stirring for about 6 hours. The resulting slurry was freeze-dried and milled into a powder.

3. Alkali-Modified Soy Protein Isolate (A-SPI)

A-SPI was prepared as described by Hettiarachchy et al., JAOCS, 72(12):1461–1464 (1995), incorporated by reference herein. Briefly, 30 grams of SPI powder was added to 400 ml of distilled water and mixed at room temperature for about two hours. Sodium hydroxide was added to the resulting mixture in order to adjust the mixture pH to 11. The mixture was stirred at 50° C. for another two hours to hydrolyze the SPI. The mixture was then freeze-dried and milled into a powder.

4. Heat-Treated Soy Protein Isolate (H-SPI)

In order to observe the effect of heat treatment on adhesive properties, 30 grams of SPI powder was added to 400 ml of distilled water. The resulting mixture was stirred at 50° C. for about two hours followed by freeze-drying and milling into a powder. No sodium hydroxide was added to this sample.

5. Wood Samples

The wood samples used in these tests were pine, maple, poplar, and walnut. Each wood sample had dimensions of approximately 3 mm×20 mm×50 mm (thickness×width×length). A 3-piece wood was used to prepare the testing specimens. The 3-piece wood comprised a base piece of wood and a second piece of wood having one of its sides positioned along one side of the base wood. The side of the second piece of wood overlapped the side of the base piece of wood by 20 mm, with the base wood being below the second piece. The base wood and second piece of wood were adhered to one another by the inventive adhesive which was applied to the overlapped portion. This arrangement was repeated with a third piece of wood which was placed along the side of the base wood remote from the adhered second piece, again with the base wood being below the second piece. Tensile strengths (discussed below) of the glued 3 piece wood samples were determined by applying force to the second piece of wood in a direction away from the third piece of wood while simultaneously applying force to the third piece of wood in a direction away from the second piece of wood. The force at which the adhered portions separated was recorded.

Application of Adhesives to the Wood Samples

The previously prepared modified SPI powders were each separately added to distilled water at a ratio of 1:6 (SPI powder:water) and mixed at room temperature for about five minutes. The resulting adhesive slurry was brushed onto each wood sample until the sample was completely wet, and the concentration of the protein on the wood surface was about 1.5 mg/cm$^2$. The slurry-brushed wood samples were kept at room temperature for about five minutes after which they were pressed by a hot press (Model 3890 Auto "M", Carver Inc., Wabash, Ind.) at a press temperature of 104° C. and pressure of 20 kg/cm$^2$ for about 15 minutes. The samples were placed in a plastic bag and maintained at ambient conditions until further analyses were performed.

Adhesive Quality Measurements

Shear strength was determined following ASTM standard method D-906 utilizing an Instron testing machine (Model 4466, Canton, Mass.) with a crosshead speed of 2.4 cm/min. The maximum shear strength at the point of breakage was recorded.

Water resistance of the adhesives (for exterior applications) was tested using the modified method as described by Hettiarachchy et al. (1995). Briefly, the specimen was soaked in tap water at room temperature for about 48 hours. The soaked specimen was then dried at room temperature in a fume hood for about 48 hours, and the delamination of the sample was determined. This procedure was repeated two more times.

Water resistance of the adhesives (for interior applications) was tested using two cycles as set forth in ASTM standard method D-1183. Briefly, in the first cycle, the sample was conditioned in a chamber at 90% relative humidity (RH) and 23° C. for about 60 hours with the shear strength being determined at this time. The sample was then conditioned at 25% RH and 48° C. for about 24 hours with the shear strength being tested again. In the second cycle, the sample was conditioned in a chamber at 90% RH and 23° C. for about 72 hours with the shear strength being determined at this time. The sample was then conditioned at 25% RH and 48 ° C. for 48 hours, and the shear strength was tested again.

Results and Discussion

Table I sets forth the shear strength of the wood specimens glued with both non-modified SPI (food grade soy protein isolate available from Archer Daniels Midland, Decatur, Ill.) and modified soybean protein adhesives. The gluing strengths of all modified SPI adhesives were strong for walnut, maple, and poplar wood samples, being in the range of 50 to 64 kg/cm$^2$.

TABLE I

Shear strength (kg/cm$^2$) of wood specimens glued with non-modified and modified soy protein adhesives.

| Sample | U-SPI | SDS-SPI | A-SPI | H-SPI | SPI[a] |
|---|---|---|---|---|---|
| Walnut | 59.74 | 54 | 59.62 | 54.48 | 39.1 |
| Maple | 57.66 | — | 64.5 | 56.2 | 50.42 |
| Poplar | 62.26 | — | 63.94 | 49.22 | 46.2 |
| Pine | 31.34 | 45 | 30.0 | 27.50 | 35.50 |

[a]Food grade soy protein isolate available from ADM.

Table II sets forth the delamination data after three cycles of the water soaking tests. The control specimens had the highest water absorption and the walnut and poplar control specimens were 100% delaminated, while the A-SPI specimens were 40–80% delaminated. Although none of the U-SPI or SDS-SPI specimens for the walnut and pine wood samples were delaminated, the maple and poplar U-SPI specimens were 20% and 40% delaminated, respectively. This is attributable to the fact that maple and poplar have higher shrinkage stress than walnut and pine wood samples. Maple and poplar had about 16% bulk volume increase after 48 hours of water soaking, which was higher than the 11% with walnut and pine. The maple and poplar samples had a linear expansion of from 6.3 to 7.6% which was higher than the linear expansion of 4.6% for walnut and pine.

The microstructure from scanning electron microscopy (SEM) indicated that the surface structure of pine consisted of well-oriented strips (i.e., smooth and neat) compared to the surface structure of walnut, maple, and poplar which was rough and randomly oriented. Though not wishing to be bound by theory, it is believed that the lower gluing strength obtained with the pine samples is a result of the surface structure.

TABLE II

Delamination (%) of wood specimens after three cycles of water soaking tests.

| Sample | U-SPI | SDS-SPI | A-SPI | H-SPI | SPI[a] |
|---|---|---|---|---|---|
| Walnut | 0 | 0 | 40 | 60 | 100 |
| Maple | 20 | — | 60 | 80 | 80 |
| Poplar | 40 | — | 80 | 80 | 100 |
| Pine | 0 | 0 | 60 | 60 | 80 |

[a]Food grade soy protein isolate available from ADM.

After 60 hours of incubating in a humidity chamber at 90% RH, the gluing strength was not reduced, but rather was increased slightly for the U-SPI, SDS-SPI, A-SPI, and H-SPI modified adhesives (see Table III compared to Table I). Water absorbed during incubation might act as a plasticizer resulting in high hydrogen bonding between protein molecules.

TABLE III

Shear strength (kg/cm$^2$) of wood specimens after 90% RH incubation at 23° C. for 60 hours.

| Sample | U-SPI | SDS-SPI | A-SPI | H-SPI | SPI[a] |
|---|---|---|---|---|---|
| Walnut | 63.8 | 55 | 60.4 | 57.50 | 46.6 |
| Maple | 53.8 | — | 64.5 | 54.66 | 44.2 |
| Poplar | 64.2 | — | 64.42 | 54.46 | 44.3 |
| Pine | 30.1 | 45 | 46.72 | 35.72 | 27.0 |

[a]Food grade soy protein isolate available from ADM.

With the samples that were incubated at 90% RH at 23° C. for 60 hours followed by 24 hours of incubation at 25% RH at 48° C., the gluing strength significantly decreased for A-SPI and H-SPI adhesives (see Table IV). The gluing strength for U-SPI and SDS-SPI remained the same for maple and poplar wood samples. However, the gluing strength of U-SPI adhesives on walnut was reduced to about 38 kg/cm$^2$. The microstructure of the walnut surface may cause the strength reduction upon wetting. The gluing strengths of most of these samples remained the same after the second incubation cycle treatment as shown in Table V.

TABLE IV

Shear strength (kg/cm$^2$) of wood specimens after first cycle incubation - 90% RH, 23° C., 60 hours and 25% RH, 48° C., 24 hours.

| Sample | U-SPI | SDS-SPI | A-SPI | H-SPI | SPI[a] |
|---|---|---|---|---|---|
| Walnut | 38.24 | 48 | 40.74 | 50.1 | 40.74 |
| Maple | 57.0 | — | 48 | 40.5 | 39.5 |
| Poplar | 63.24 | — | 50.0 | 42.74 | 47.0 |
| Pine | 31.74 | 44 | 42.74 | 25.0 | 29.26 |

[a]Food grade soy protein isolate available from ADM.

TABLE V

Shear strength (kg/cm$^2$) of wood specimens after second cycle incubation - 90% RH, 23° C., 72 hours and 25% RH, 48° C., 24 hours.

| Sample | U-SPI | SDS-SPI | A-SPI | H-SPI | SPI[a] |
|---|---|---|---|---|---|
| Walnut | 37.16 | 45 | 40.1 | 39.4 | 35.0 |
| Maple | 57.46 | — | 45.4 | 41.00 | 41.88 |
| Poplar | 53.28 | — | 50.0 | 43.34 | 41.3 |
| Pine | 30.74 | 42 | 39.26 | 24.00 | 26.32 |

[a]Food grade soy protein isolate available from ADM.

Therefore, the urea-modified and SDS-modified soy protein adhesives were excellent adhesives because they had higher bonding strengths and lower water absorptions while retaining the environmentally safe characteristics of the unmodified soy protein adhesives.

EXAMPLE 2

U-SPI adhesive was prepared as described in Example 1. The wood samples used in this test were walnut, pine, and cherry. Each wood sample had dimensions of approximately 3 mm×20 mm×50 mm (thickness×width×length). At least five samples of each type of wood were utilized. The procedures by which the U-SPI adhesive was applied to the wood samples were exactly as described in Example 1.

Wood samples of each wood type were soaked in water at room temperature for 24 hours, 48 hours, and 72 hours, respectively. After the respective soaking, the shear strength of each sample was determined and is set forth in Table VI below.

TABLE VI

Shear strength (kg/cm$^2$) of wood samples glued with U-SPI adhesive after water soaking.

| Sample | 24 HOURS | 48 HOURS | 72 HOURS |
|---|---|---|---|
| Walnut | 48.2 | 48 | 43.5 |
| Pine | 22.5 | 22.3 | 20.75 |
| Cherry | 55 | 49 | 54.5 |

EXAMPLE 3

U-SPI adhesive was prepared as described in Example 1. A cherry wood sample was prepared and adhesive applied as described in Example 2. The water resistance of the adhesive (for exterior applications) was tested using the modified method as described by Hettiarachchy et al. (1995) and as described in Example 1. There was no delamination of the cherry wood glued with the U-SPI adhesive.

EXAMPLE 4

This test was conducted to determine the viscosity and thermal stability of urea-modified soy protein adhesives compared to the viscosity and thermal stability of non-modified soy protein adhesives. U-SPI adhesive was prepared as described in Example 1. A sample of the U-SPI adhesive and a sample of a non-modified soy protein adhesive (food grade SPI available from ADM) were tested on a rapid viscosity analyzer (RAV). The results, shown in FIG. 1, indicate that the U-SPI adhesive has a lower viscosity and is more stable thermally than the non-modified soy protein adhesives. This means that the adhesives of the invention may be applied more easily and have a longer working life with greater thermal stability compared to non-modified soy protein adhesives.

EXAMPLE 5

U-SPI adhesives (having a 16% solids content) were prepared following the procedure described in Example 1, but varying the quantities of urea to achieve adhesives having concentrations of 2M, 4M, 6M, and 8M of urea. The thermal transitions of the modified adhesives were measured with a differential scanning calorimeter (DSC). These transitions were compared to the thermal transitions of non-modified soy protein adhesives having a 16% solids content (food grade SPI available from ADM). The calorimeter used was a Perkin-Elmer DSC 7 instrument (Perkin-Elmer, Norwalk, Conn.) calibrated with indium and zinc. The DSC temperature scan range was from 20° C. to 180° C. at a heating rate of 10° C./min. A large DSC pan was used to hold the samples.

Figure 2:
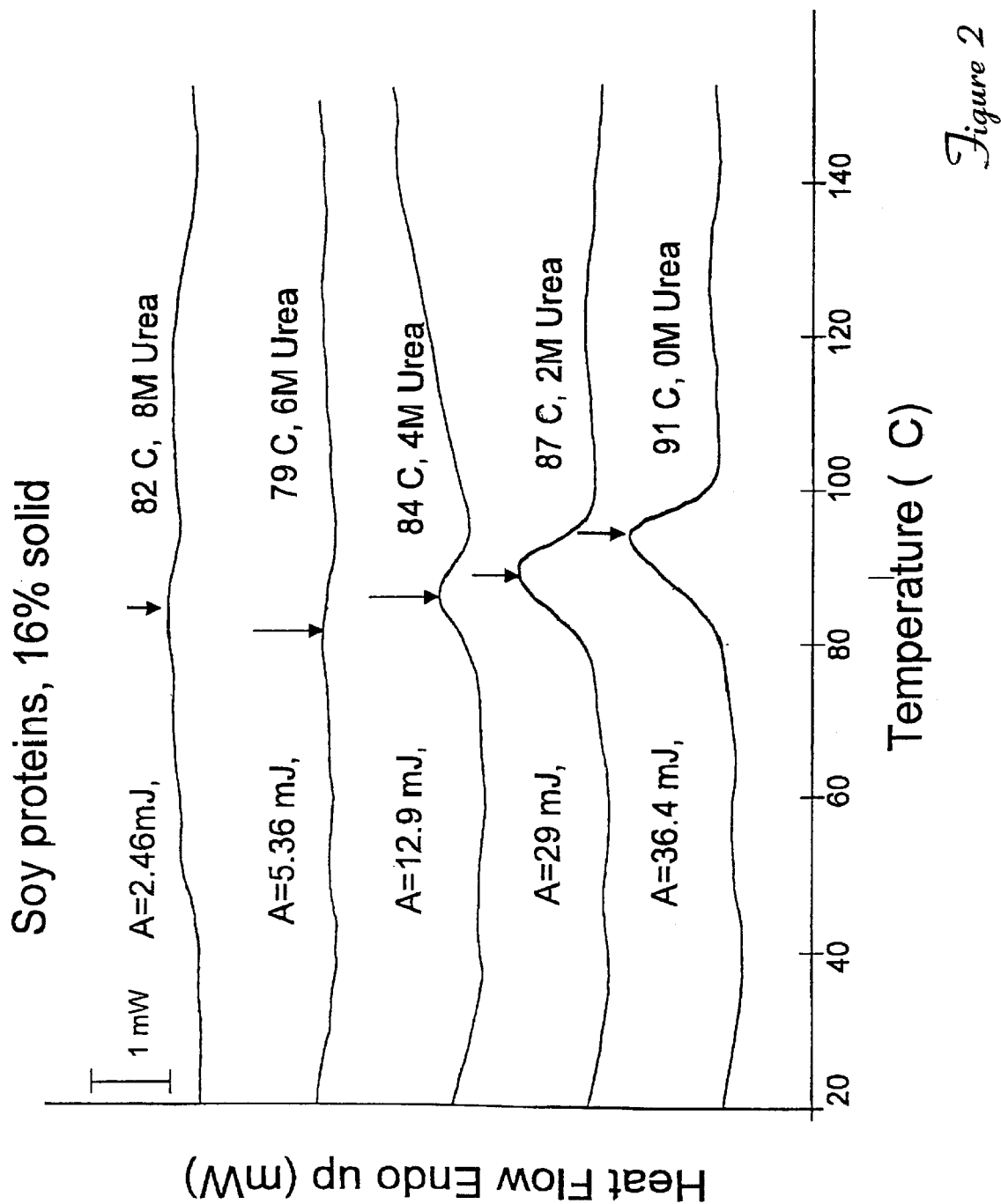
FIG. 2 illustrates the differential scanning calorimeter curves of a soy protein slurry having a solids concentration of 16% and a urea concentration of 0M, 2M, 4M, 6M, and 8M.

The thermal transition peaks of the U-SPI adhesives are shown in FIG. 2. The area of the thermal transition peak of a DSC curve corresponds to the protein structure and denaturation of the sample. In FIG. 2, the non-modified soy protein adhesive (i.e., 0M urea) gave the largest peak area. The peak area decreased as the urea concentration increased. These results confirm that urea modifies the soy protein structure.

EXAMPLE 6

SDS-SPI adhesives having varying concentrations of SDS were prepared. During these tests, a solution was prepared containing 0.5% SDS and 99.5% distilled water. To this solution, 10 g of SPI powder was added, and the resulting suspension was mixed for about 6 hours. A similar procedure was followed to prepare 1% by weight SDS-SPI adhesives and 3% by weight SDS-SPI adhesives. The wood samples used in these tests were cherry, pine, and walnut. Each wood sample had dimensions of approximately 3 mm×20 mm×50 mm (thickness×width×length). The procedures by which the SDS-SPI adhesive was applied to the wood samples were exactly as described in Example 1. Table VII sets forth the shear strength of the wood specimens glued with the SPS-SPI and the non-modified SPI as determined following the procedures set forth in Example 1.

TABLE VII

Shear strength (kg/cm$^2$) of wood specimens glued with non-modified and sodium dodecyl sulfate (SDS) (0.5%, 1%, and 3%)-modified soy protein adhesives.

| Sample | 0.5% SDS-SPI | 1% SDS-SPI | 3% SDS-SPI | SPI[a] |
|---|---|---|---|---|
| Cherry | 54 ± 8 | 55 ± 7 | 38 ± 9 | 41 ± 7 |
| Pine | 46 ± 5 | 45 ± 3 | 42 ± 6 | 31 ± 4 |
| Walnut | 52 ± 9 | 54 ± 10 | 37 ± 7 | 30 ± 12 |

[a]Food grade soy protein isolate available from ADM.

EXAMPLE 7

SDS-SPI adhesives and wood samples were prepared as described in Example 6. In these tests, the shear strength of the wood specimens was determined after the samples were incubated at 90% RH for 72 hours at 23° C. followed by incubation at 25% RH for 24 hours at 48° C., with this cycle then being repeated twice. These results are set forth in Table VIII below.

TABLE VIII

Shear strength (kg/cm$^2$) of wood specimens glued with non-modified and sodium dodecyl sulfate (SDS) (0.5%, 1%, and 3%)-modified soy protein adhesives after incubation aging test.

| Sample | 0.5% SDS-SPI | 1% SDS-SPI | 3% SDS-SPI | SPI[a] |
|---|---|---|---|---|
| Cherry | 45 ± 8 | 50 ± 9 | 30 ± 8 | 38 ± 5 |
| Pine | 43 ± 8 | 43 ± 9 | 37 ± 7 | 21 ± 8 |
| Walnut | 44 ± 6 | 46 ± 8 | 26 ± 7 | 25 ± 9 |

[a]Food grade soy protein isolate available from ADM.

EXAMPLE 8

SDS-SPI adhesives and wood samples were prepared as described in Example 6. In these tests, the % delamination was determined after subjecting the specimens to three cycles of water soaking as described in Example 1. The SDS-SPI specimens each had 0% delamination while the non-modified samples had 90–100% delamination.

TABLE IX

Delamination (%) of wood specimens glued with non-modified and sodium dodecyl sulfate (SDS) (0.5%, 1%, and 3%)-modified soy protein adhesives after water soaking test.

| Sample | 0.5% SDS-SPI | 1% SDS-SPI | 3% SDS-SPI | SPI[a] |
|---|---|---|---|---|
| Cherry | 0 | 0 | 0 | 100 |
| Pine | 0 | 0 | 0 | 90 |
| Walnut | 0 | 0 | 0 | 100 |

[a]Food grade soy protein isolate available from ADM.

EXAMPLE 9

SDS-SPI adhesives and wood samples were prepared as described in Example 6. These specimens were subjected to three cycles of water soaking. The samples' shear strength was then determined following the procedures set forth in Example 1. Table X sets forth the results of these tests. While the shear strength did decrease somewhat compared to the shear strength of the samples which were not subjected to any water soaking tests, the SDS-SPI adhesives showed much greater shear strength than did the non-modified samples.

TABLE X

Shear strength (kg/cm$^2$) of wood specimens glued with non-modified and sodium dodecyl sulfate (SDS) (0.5%, 1%, and 3%)-modified soy protein adhesives after water soaking test.

| Sample | 0.5% SDS-SPI | 1% SDS-SPI | 3% SDS-SPI | SPI[a] |
|---|---|---|---|---|
| Cherry | 33 ± 9 | 49 ± 8 | 32 ± 7 | — |
| Pine | 31 ± 7 | 41 ± 9 | 33 ± 8 | 6 ± 0 |
| Walnut | 26 ± 8 | 49 ± 6 | 24 ± 8 | — |

[a]Food grade soy protein isolate available from ADM.

EXAMPLE 10

In conducting the following tests, adhesives having 0.5%, 1%, and 3% by weight of SDBS, respectively, were prepared in a manner similar to that described in Example 6 with respect to the SDS-SPI adhesives. Similar tests were conducted on the SDBS specimens as those described in Examples 6–9 above. This data is reported in Tables XI–XIV. The SDBS-SPI adhesives showed shear strength comparable to the SDS-SPI adhesives and superior to that of the non-modified adhesives, even after the incubation and water soaking tests. Furthermore, as reported in Table XIII, the SDBS-SPI specimens exhibited 0% delamination after the water soaking tests while the non-modified samples demonstrated 90–100% delamination.

TABLE XI

Shear strength (kg/cm$^2$) of wood specimens glued with non-modified and sodium dodecylbenzene sulfonate (SDBS) (0.5%, 1%, and 3%)-modified soy protein adhesives.

| Sample | 0.5% SDBS-SPI | 1% SDBS-SPI | 3% SDBS-SPI | SPI[a] |
|---|---|---|---|---|
| Cherry | 55 ± 10 | 58 ± 9 | 33 ± 8 | 41 ± 7 |
| Pine | 47 ± 7 | 49 ± 6 | 43 ± 7 | 31 ± 4 |
| Walnut | 50 ± 8 | 51 ± 7 | 36 ± 6 | 30 ± 12 |

[a]Food grade soy protein isolate available from ADM.

TABLE XII

Shear strength (kg/cm$^2$) of wood specimens glued with non-modified and sodium dodecylbenzene sulfonate (SDBS) (0.5%, 1%, and 3%)-modified soy protein adhesives after incubation aging test.

| Sample | 0.5% SDBS-SPI | 1% SDBS-SPI | 3% SDBS-SPI | SPI[a] |
|---|---|---|---|---|
| Cherry | 48 ± 7 | 53 ± 8 | 31 ± 5 | 38 ± 5 |
| Pine | 44 ± 9 | 45 ± 8 | 42 ± 8 | 21 ± 8 |
| Walnut | 44 ± 7 | 48 ± 7 | 27 ± 5 | 25 ± 9 |

[a]Food grade soy protein isolate available from ADM.

TABLE XIII

Delamination (%) of wood specimens glued with non-modified and sodium dodecylbenzene sulfonate (SDBS) (0.5%, 1%, and 3%)-modified soy protein adhesives after water soaking test.

| Sample | 0.5% SDBS-SPI | 1% SDBS-SPI | 3% SDBS-SPI | SPI[a] |
|---|---|---|---|---|
| Cherry | 0 | 0 | 0 | 100 |
| Pine | 0 | 0 | 0 | 90 |
| Walnut | 0 | 0 | 0 | 100 |

[a]Food grade soy protein isolate available from ADM.

TABLE XIV

Shear strength (kg/cm$^2$) of wood specimens glued with non-modified and sodium dodecylbenzene sulfonate (SDBS) (0.5%, 1%, and 3%)-modified soy protein adhesives after water soaking test.

| Sample | 0.5% SDBS-SPI | 1% SDBS-SPI | 3% SDBS-SPI | SPI[a] |
|---|---|---|---|---|
| Cherry | 35 ± 7 | 49 ± 3 | 30 ± 6 | — |
| Pine | 32 ± 8 | 45 ± 5 | 42 ± 5 | 6 ± 0 |
| Walnut | 23 ± 5 | 48 ± 6 | 23 ± 9 | — |

[a]Food grade soy protein isolate available from ADM.

EXAMPLE 11

In this example, U-SPI adhesives were prepared and shear strength and delamination properties were determined. Urea solutions (1, 3, 5, and 8 M) were prepared at room temperature. Ten grams of SPI powder was suspended in each solution (100 ml) with the resulting suspension being stirred and reacted for 6 hours.

Three wood varieties ranging from hard to soft (walnut, cherry, and pine) were used. The wood samples were prepared for testing as described by Kalapathy et al., *JAOCS*, 72:507–510 (1995), incorporated by reference herein, with some modifications. Each wood piece had dimensions of 3 mm×20 mm×50 mm (thickness×width×length). Three pieces of wood were glued to form a single wood specimen. The modified adhesive slurry was brushed onto both ends of one wood piece and onto one end of the remaining two wood pieces. The area of coverage on the ends receiving adhesive application was 2 cm×2 cm to give a protein concentration of 1.80 mg/cm$^2$ with a standard deviation of 0.04 mg/cm$^2$. After adhesive application, the wood pieces were allowed to rest at room temperature for about five minutes after which they were glued together and pressed using a hot press for about seven minutes under the conditions described in Example 1. The pressed specimens were kept in a plastic bag under ambient conditions for four days. The test results are set forth in Tables XV–XVI.

TABLE XV

Shear Strength (kg/cm$^2$) of Wood Specimens Glued with Non-Modified and Urea (U) (1, 3, 5, and 8 (M))-Modified Soy Protein Adhesives.

| Sample | 1M U-SPI | 3M U-SPI | 5M U-SPI | 8M U-SPI | SPI[a] |
|---|---|---|---|---|---|
| Walnut | 48 ± 11 | 54 ± 5 | 46 ± 7 | 26 ± 10 | 30 ± 12 |
| Cherry | 42 ± 8 | 59 ± 10 | 37 ± 5 | 33 ± 7 | 41 ± 7 |
| Pine | 41 ± 9 | 42 ± 6 | 40 ± 5 | 36 ± 9 | 31 ± 4 |

[a]Non-modified soy proteins.

TABLE XVI

Shear Strength (kg/cm$^2$) and Delamination (%) of Wood Specimens Glued with Non-Modified and Urea (U) (1, 3, 5, and 8 (M))-Modified Soy Protein Adhesives after Incubation Aging and Water Soaking Tests.

| Sample | 1M U-SPI | 3M U-SPI | 5M U-SPI | 8M U-SPI | SPI[a] |
|---|---|---|---|---|---|
| Shear Strength after Incubation | | | | | |
| Walnut | 49 ± 3 | 45 ± 7 | 33 ± 5 | 21 ± 4 | 25 ± 9 |
| Cherry | 42 ± 7 | 49 ± 11 | 29 ± 8 | 25 ± 7 | 38 ± 5 |
| Pine | 41 ± 4 | 39 ± 5 | 31 ± 4 | 21 ± 9 | 21 ± 8 |
| Delamination after Water Soaking | | | | | |
| Walnut | 10 | 0 | 20 | 90 | 100 |
| Cherry | 0 | 0 | 30 | 100 | 100 |
| Pine | 0 | 0 | 0 | 0 | 90 |
| Shear Strength after Water Soaking | | | | | |
| Walnut | 8 ± 2 | 10 ± 2 | 5 ± 1 | 4 ± 0 | — |
| Cherry | 12 ± 2 | 14 ± 3 | 7 ± 2 | — | — |
| Pine | 17 ± 2 | 25 ± 3 | 12 ± 2 | 5 ± 1 | 6 ± 0 |

[a]Non-modified soy proteins.

EXAMPLE 12

In this example, guanidine hydrochloride modified SPI adhesives (GH-SPI) were prepared. GH solutions (0.5, 1, and 3M) were prepared at room temperature. Ten grams of SPI was suspended in each GH solutions (100 ml) with the resulting suspension being stirred and reacted for 6 hours. Wood samples were prepared and adhesives were applied to those samples as described in Example 11. The same tests were conducted on the samples as described above with respect to Example 11. These results are reported in Tables XVII–XVIII.

The GH-SPI adhesives having 0.5M and 1M concentrations of GH exhibited greater shear strengths than the non-modified control adhesive. The 1M GH adhesives exhibited the highest shear strength within each wood category. The 0.5M and 1M GH-modified protein adhesives exhibited superior shear strengths after the incubation aging tests and water soaking test and had zero delamination.

TABLE XVII

Shear Strength (kg/cm$^2$) of Wood Specimens Glued with Non-Modified and Guanidine Hydrochloride (GH) (0.5, 1, and 3 (M))-Modified Soy Protein Adhesives.

| Sample | 0.5M GH-SPI | 1M GH-SPI | 3M GH-SPI | SPI[a] |
|---|---|---|---|---|
| Walnut | 44 ± 7 | 51 ± 6 | 36 ± 5 | 30 ± 12 |
| Cherry | 49 ± 7 | 60 ± 3 | 36 ± 4 | 41 ± 7 |
| Pine | 48 ± 3 | 47 ± 6 | 41 ± 4 | 31 ± 4 |

[a]Non-Modified soy proteins.

TABLE XVIII

Shear Strength (kg/cm$^2$) and Delamination (%) of Wood Specimens Glued with Non-Modified and Guanidine Hydrochloride (GH) (0.5M, 1M, and 3M)-Modified Soy Protein Adhesives after Incubation Aging and Water Soaking Tests.

| Sample | 0.5M GH-SPI | 1M GH-SPI | 3M GH-SPI | SPI[a] |
|---|---|---|---|---|
| | Shear Strength after Incubation | | | |
| Walnut | 41 ± 3 | 38 ± 4 | 32 ± 5 | 25 ± 9 |
| Cherry | 38 ± 5 | 49 ± 5 | 32 ± 4 | 38 ± 5 |
| Pine | 40 ± 5 | 37 ± 5 | 42 ± 7 | 21 ± 8 |
| | Delamination after Water Soaking | | | |
| Walnut | 0 | 0 | 100 | 100 |
| Cherry | 0 | 0 | 100 | 100 |
| Pine | 0 | 0 | 0 | 90 |
| | Shear Strength after Water Soaking | | | |
| Walnut | 11 ± 2 | 7 ± 2 | — | — |
| Cherry | 9 ± 2 | 13 ± 6 | — | — |
| Pine | 20 ± 2 | 37 ± 3 | 9 ± 3 | 6 ± 0 |

[a]Non-modified soy proteins.

We claim:

1. A soy protein-based adhesive comprising a quantity of soy protein isolate reacted in an aqueous system with a modifier to form a soy protein isolate slurry, said modifier being guanidine hydrochloride, said adhesive having the property of adhering wooden adherends together such that the bond exhibits a shear strength of at least about 30 kg/cm$^2$, using ASTM Method D-906.

2. A process for producing an adhesive comprising the steps of:
    (a) providing a quantity of previously prepared soy protein isolate; and
    (b) mixing said soy protein isolate with a modifier to form a protein slurry and causing said modifier to react with said soy protein isolate to form a soy protein isolate-modifier adhesive,
said modifier being guanidine hydrochloride.

* * * * *